W. B. FRUE.
Ore-Washer.

No. 8,881. Reissued Sept. 2, 1879.

Witness:
H. L. Aulls,
E. Kuenzel.

Inventor:
Wm Bell Frue
By Atty
Thos S. Sprague

THE NORRIS PETERS CO., PHOTO-LITHO., WASHINGTON, D. C.

UNITED STATES PATENT OFFICE.

WILLIAM B. FRUE, OF DETROIT, MICHIGAN.

IMPROVEMENT IN ORE-WASHERS.

Specification forming part of Letters Patent No. 158,057, dated December 22, 1874; Reissue No. 8,881, dated September 2, 1879; application filed February 7, 1878.

*To all whom it may concern:*

Be it known that I, WILLIAM BELL FRUE, late of Silver Islet, Province of Ontario, Canada, but now of Detroit, in the county of Wayne and State of Michigan, have invented a new and Improved Ore-Washer, of which the following is a specification.

My invention relates more particularly to that class of separating machinery known as "vanning-machines," its object being to effect a separation of the heavy ores or metals, such as gold, silver, copper, tin, &c., from the associated rock when in a pulverized condition and suspended in a current of water.

The objection heretofore to those machines having endless laterally-moving aprons has been that the operating-drum, being arranged to move laterally with the apron, soon throws or slops so much of the water out of the stationary water-tank that the particles of ore are not thoroughly washed from the apron in its movement through such tank; and, further, from the manner of arranging the sand-sluice and water-box, it was thought necessary to place a roller against the upper end of the apron to prevent the water from passing over; which roller pressed the particles of ore passing under it into the apron, wearing the same rapidly. These objections I overcome by mounting the operating-drum in stationary bearings, and by removing the pressing-roller and arranging the water-sluice behind the sand-sluice near the upper end of the apron and inclining both sluices toward the lower end of the apron.

My invention consists, first, in the combination, with the inclined and laterally-shaking apron, of the stationary water-tank and the drum in the water-tank mounted in stationary bearings; second, in the combination of the same parts with the water and sand sluices, arranged one behind the other above the apron, the apron being left clear at its upper end for the particles of ore to pass over without friction; and, third, in the combination, with the apron, water-tank, and operating-drum, of an adjustable pulley for tightening the apron, all as fully hereinafter explained.

Figure 1:
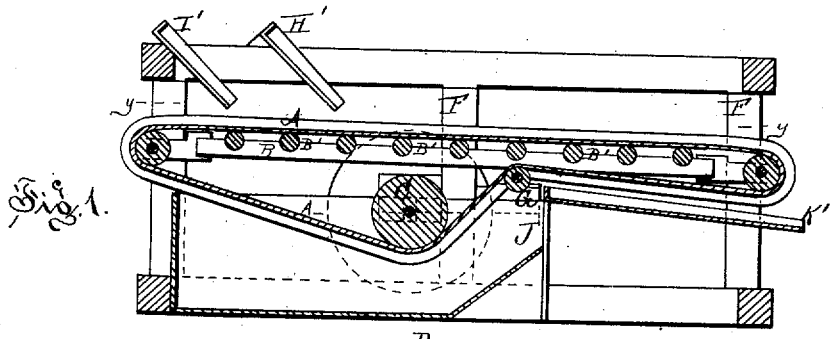
Figure 2:
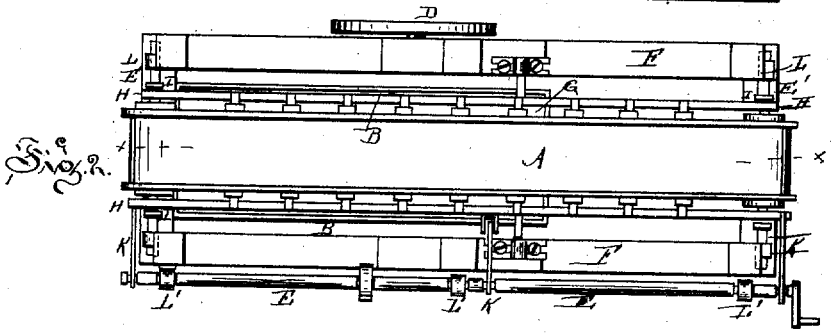
Figure 3:
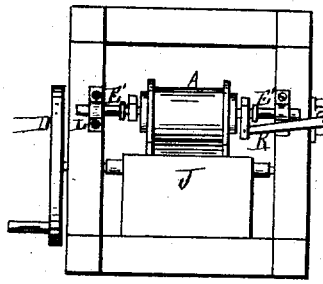

Figure 1 is a longitudinal sectional elevation taken on the line *x x* of Fig. 2. Fig. 2 is a horizontal sectional elevation on line *y y*, Fig. 1; and Fig. 3, an end elevation of a vanning-machine constructed according to my invention.

Like letters of reference indicate like parts.

In the drawings, F is the outer frame of the machine, strongly constructed of wood or iron, within which the apron-frame B is supported on the sliding shafts E′, held in suitable bearings L. To these sliding shafts fixed pulleys are attached, around which passes the endless apron or conveyer A, driven from the drum C, which is placed underneath and near the center of the apron-frame B, and which gives a continuous progressive motion to the endless apron A. The position of the drum C, being the point of least lateral motion of the belt, reduces the wear on the same to a minimum.

D is the driving-pulley. The apron B is moved laterally with a quick vibratory motion by the connecting-rods K and crank-shaft E. I I are collar-rings, fastened by a set-screw to sliding shafts E′, for holding the yokes H on the end of the apron-frame B, to which—*i. e.*, to the yokes H—the connecting-rods K are attached in position.

The endless apron A travels over and is supported by the rollers B′ B′ B′, resting in suitable bearings on the apron-frame B.

G is the regulating-pulley, used for guiding the endless apron parallel to the apron-frame, and also as a tightener to increase the friction between the large drum C and the apron. This pulley is adjustable toward and away from the drum C to increase or diminish the friction upon the apron. This adjustment may be effected in any suitable manner. The shaft of the pulley is shown as journaled in boxes, which are slotted and are secured to the frame F by bolts working in these slots, so that by loosening the bolts the boxes can be moved for a limited distance upon the frame.

I′ is the water-sluice, and H′ the sand or ore sluice. L′ L′ are pillow-blocks. J is the collecting-tank, filled with water, into which the endless apron dips when passing around drum C.

The endless belt A is made of rubber and canvas, or other suitable material, with upright rubber flanges attached along its edges and rising a short distance above its upper surface. The flanges are made sufficiently elastic to avoid distortion when passing around the pulleys. The upper surface of the apron is inclined from the horizontal by slope of apron-frame B, in order that the water and sand may flow down to the lower end of the machine into waste-launder K′.

The operation of the machine is as follows: The powdered material, suspended in a current of water, flows down the sand-sluice, and is distributed by a spreader in the same over the width of the apron, flowing down the inclined surface of the same toward the lower end of the machine. A regulated stream of water runs from the water-sluice behind the sand-sluice. At the same time the endless apron A travels slowly and continuously, receiving at the same time a rapid shaking motion from the crank-shaft E. The heavier ores and metals are settled by the shaking motion, and are carried by the apron up against the descending stream of water, to be ultimately deposited in the water-tank underneath, through which the now inverted apron passes. A light stream of water playing on the under side of the apron as it leaves the tank washes back any still adhering particles of ore or metal. The lighter particles of rock are washed down the apron by the stream of water, and drop over the lower end roller into the waste or tailings launder.

I do not wish it to be understood that I confine myself to the secondary motion as communicated by the connecting-rods K and crank-shaft E, as there are many different ways in which an equivalent motion can be imparted to the endless traveling apron A. I have merely selected the construction described and shown in the drawings, believing it to answer the purpose best.

What I claim as my invention is—

1. In an ore-washer, the combination of a moving inclined and laterally-shaking endless apron or belt with a stationary water-tank and a drum in such water-tank, under which the apron moves, revolving in stationary bearings, substantially as described.

2. In an ore-washer, the combination, with a stationary water-tank and a drum in such tank rotating in stationary bearings, of an inclined laterally-shaking endless apron or belt moving under such drum, and sand and water sluices placed one behind the other, in the order named, above the apron near its upper end, the apron being left clear for the particles of ore to pass over its upper end without cutting or wearing the same, substantially as described and shown.

3. In ore-washers, the combination, with a stationary frame, of the endless apron A, vibrating in the said frame, the operating-drum C, journaled in stationary bearings, and the pulley G, journaled in the stationary frame, and adjustable upon the same, substantially as and for the purposes set forth.

WILLIAM BELL FRUE.

Witnesses:
H. S. SPRAGUE,
R. A. SPRAGUE.